UNITED STATES PATENT OFFICE 2,387,195

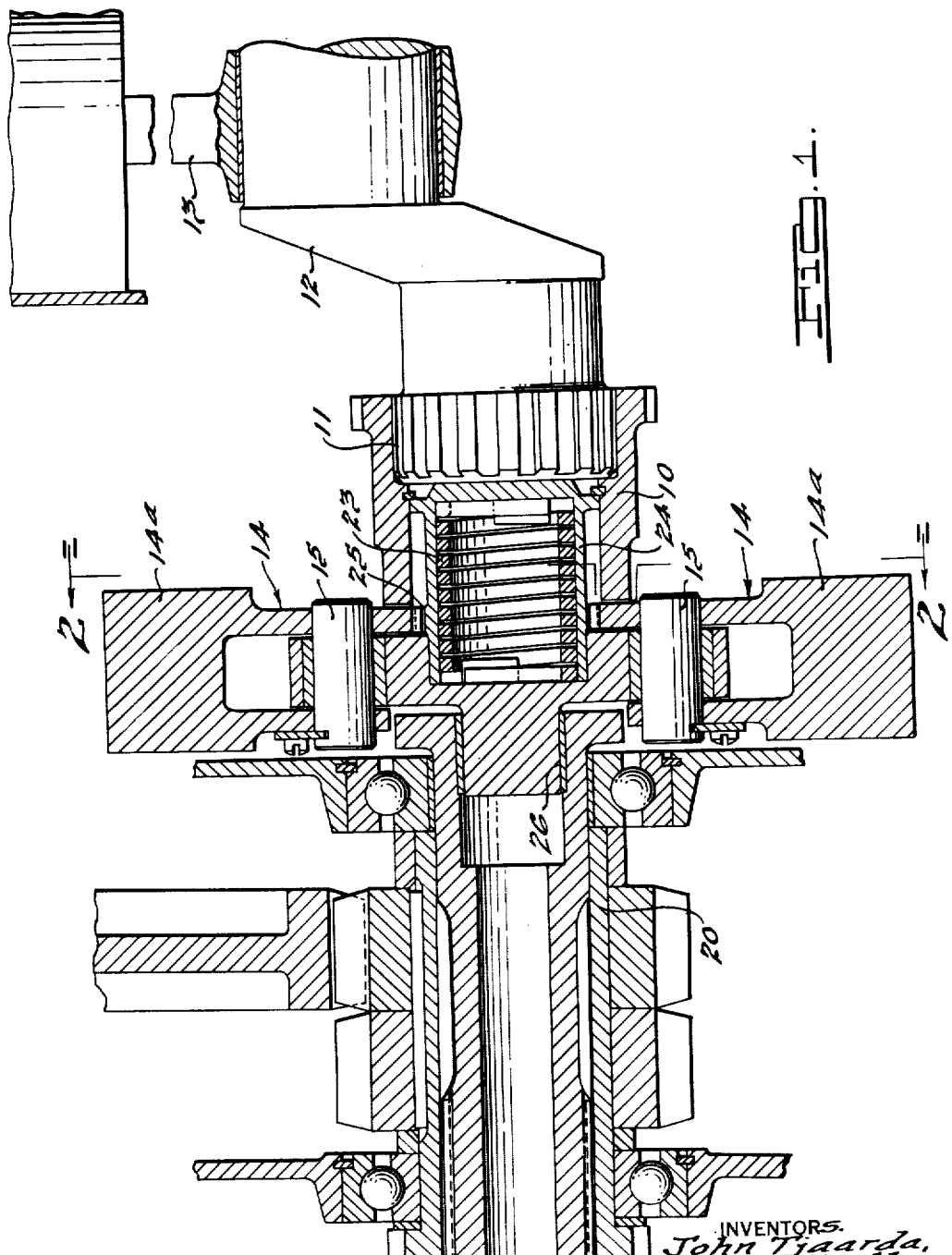

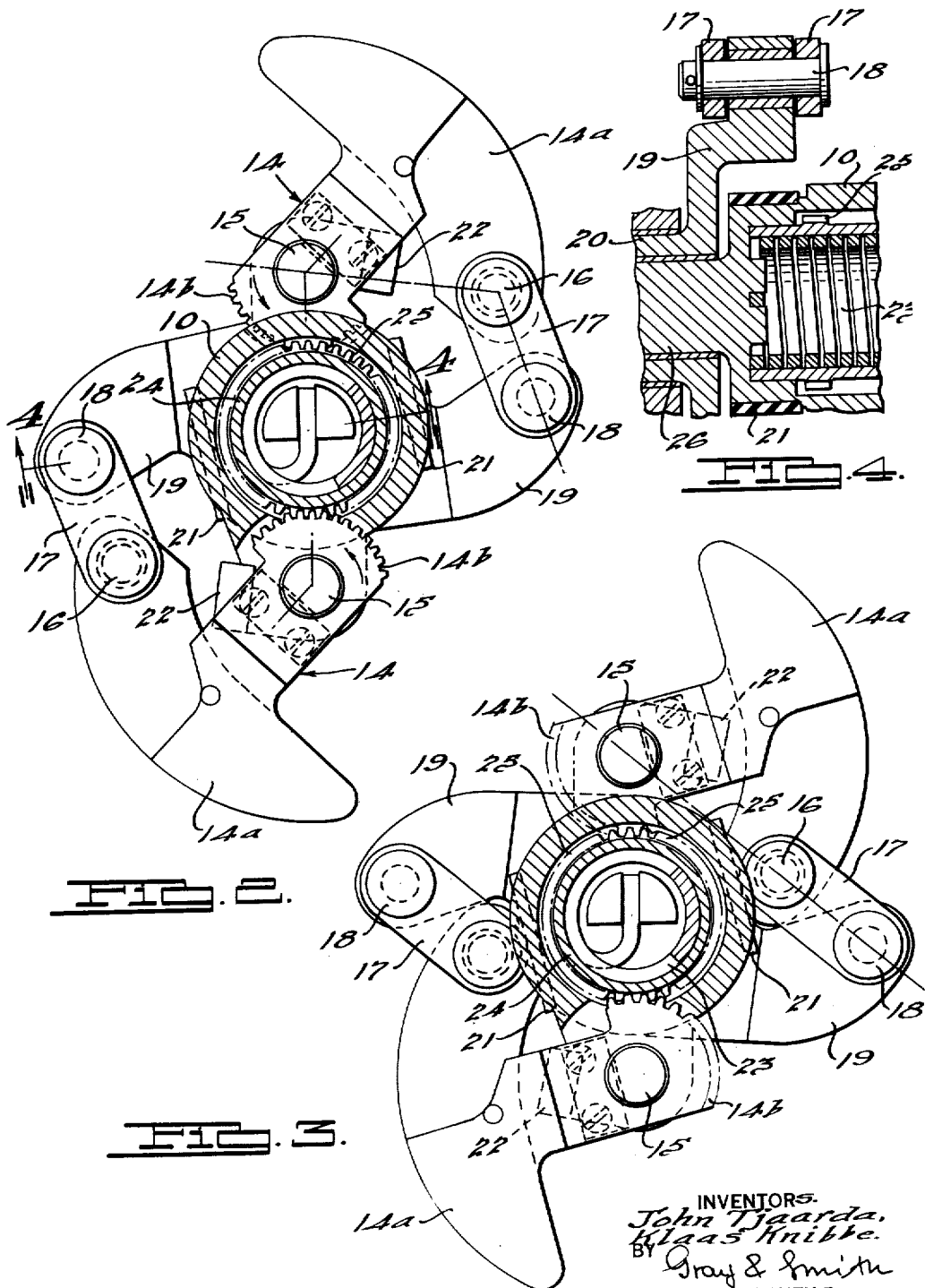

COUPLING

John Tjaarda, Detroit, and Klaas Knibbe, Grosse Pointe Park, Mich., assignors to Briggs Manufacturing Company, Detroit, Mich., a corporation of Michigan Application April 30, 1941, Serial No. 391,030

7 Claims. (Cl. 64—25)

This invention relates to shaft couplings intended for transmission of torque, and more particularly to such couplings having dampening or vibration eliminating means and intended for use in structures wherein pulsating torque is developed and is to be transmitted for steady driving of operative parts at uniform speeds, such for instance as in cases of internal combustion engines, particularly such engines used in various types of aircraft.

It is well appreciated in the art that internal combustion engines develop pulsating torque, the maximum value whereof lasts only for a few degrees of the crank rotation, which in modern high speed engines may last only about 1/10,000 of a second. The driving torque is produced by rapid succession of such pulsations, which pulsations are in turn produced by the explosions in the engine cylinders. The more rapid are the explosions, the more rapid are the pulsations and the smoother is the torque delivered. However, since the increase of the rapidity of pulsations is limited by the number of cylinders and the speed of the engine, some external means have to be dependend upon for preventing transmission of torque vibrations to other devices such as gearing, etc., which vibrations are particularly serious at the critical speed of the engine. Use of quilshafts and other flexible materials such as rubber and Bakelite has the disadvantage of having high deflection and violent vibrations at critical speeds.

One of the objects of the present invention is to provide an improved coupling, particularly but not exclusively adapted for use in internal combustion engines, especially of the aviation or aircraft type.

Another object of the invention is to provide an improved coupling adapted to be operatively interposed between the crankshaft of an aviation engine and the reduction gear and the propeller driven by said engine.

A further object of the invention is to provide an improved coupling for a propeller driving engine, which is adapted to smooth out and eliminate torque pulsations and to deliver power to the reduction gear and the propeller in smooth and uniform flow, thereby permitting use of lighter propellers and also eliminating failures of propellers and reduction gears.

A still further object of the invention is to provide an improved coupling for an aviation internal combustion engine, in which coupling the resistance to the deflection or relative movements of the connected parts and the effort causing such deflection are substantially uniform at all speeds and therefore the connected parts operate through the entire range of engine speeds with substantially equal deflection or relative resilient movement.

A still further object of the invention is to provide an improved resilient coupling for an aviation engine, in which the deflection of the resilient means and linkage affecting the same are so selected as to give an approximately straight line relationship between the relative rotation of the connected shafts and the torque transmitted.

A still further object of the invention is to provide an improved coupling for an aircraft engine, means being provided to limit the relative motion of the connected shafts in order to prevent excessive deflection as well as means for transmitting torque in the reverse direction when in flight the propeller tends to drive the engine.

A still further object of the invention is to provide an improved coupling for drivingly connecting two shafts, means being provided whereby said shafts are positively connected for transmission of mechanical energy until the rotative speed of said shafts reaches a predetermined speed.

It is an added object of the present invention to provide an improved structure of the foregoing character which is simple in construction, safe and dependable in operation, and relatively inexpensive to manufacture.

Other objects of this invention will appear in the following description and appended claims, reference being had to the accompanying drawings forming a part of this specification wherein like reference characters designate corresponding parts in the several views.

Fig. 1 is a longitudinal sectional view taken through the driving and driven shafts as well as through the coupling connecting the same.

Fig. 2 is a transverse sectional view taken in the direction of the arrows on the section plane passing through the line 2—2 of Fig. 1, the operative parts of the coupling being shown in positions when the shafts are rotating at a relatively high speed.

Fig. 3 is a view similar in part to Fig. 2, the operative parts of the coupling being shown in positions when the shafts are stationary or are operating at a low speed.

Fig. 4 is a fragmentary sectional view taken in the direction of the arrows on the section line 4—4 of Fig. 2.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is shown, by way of example, a coupling adapted to be operatively interposed between a driving and a driven shaft for transmission of rotative effort or mechanical energy between said shafts in either direction. The coupling hereinafter described in detail is adapted for use between two rotatable shafts wherein the driving shaft is delivering pulsating torque and where it is necessary to eliminate said pulsations in order to preserve the parts connected to the driven shaft, such for instance as trains of gears and the like. Although the coupling may be used in any instance wherein the above specified conditions exist, it is particularly adapted for use in aircraft power plants having a driving shaft receiving pulsating torque, such for instance as that which is delivered by an internal combustion engine, and delivering said torque to the reduction gearing adapted to drive the propeller.

The coupling comprises generally a plurality of linkages, two of them being used in the present instance to produce a statically balanced device, which linkages connect drivingly the driving and the driven shafts and permit varying angular displacement therebetween. At the low speed of the engine said linkages are adapted to align themselves in such a way that when a maximum angular displacement between said shafts occurs, they are connected for transmission of driving force positively. Means are provided whereby as the speed of the shafts increases the linkages are moved by the action of the centrifugal force developed into respective positions to decrease the angular displacement between the shafts. Since in aircraft operation the torque necessary to drive the propeller usually increases as the square of the speed thereof, and the centrifugal force also increases in a square relation to the speed, the torque and the centrifugal force may be balanced with a small correction factor, and this in turn enables in accordance with the present invention, the attainment of a substantially uniform angular displacement between the connected shafts through the entire operative range of torques and speeds.

The linkages, the centrifugal means thereof, and the resilient means are so selected that a substantially straight line relationship between the torque and the displacement of the shafts is maintained throughout substantially the entire operative speed range of the engine.

Referring to the drawings, the structure illustrated therein comprises a sleeve 10 connected by splining as indicated at 11 to the end of the driving or crankshaft 12 actuated by a plurality of connecting rods 13, only one connecting rod being shown in the drawings. Such connecting rods are actuated by pistons of any suitable engine.

To the sleeve 10 there are hingedly connected two T-shaped links. Since said T-shaped links as well as the parts connected thereto are similar, only one of said links and its complementary parts will be described herein in detail, it being understood that for every part of one linkage in which a T-shaped link enters as a part, there is a corresponding part in the second linkage provided in said coupling opposite to the first linkage. The hinge of the T-shaped link 14 connecting the same to the sleeve 10 is indicated at 15. The T-shaped link has a weight portion 14a formed thereon as shown in the drawings, one end of which is hingedly connected as at 16 to a connecting link 17, the opposite end whereof is connected with the aid of a hinge 18 to a lug 19 drivingly secured to the driven shaft, in the present embodiment the reduction gear shaft 20.

When the driven shaft is rotated in the direction which appears counterclockwise in Figs. 2 and 3, the driving force tends to stretch the linkage formed by the links 14 and 17, disposing their hinges or pivots 15, 16 and 18 along a straight line as shown in Fig. 3. Under such conditions, the driving and the driven shafts are positively connected and since the hinge end of the weight portion 14a of the link 14 contacts a bumper 21, the shafts may be considered as locked for a positive transmission of driving force.

As the rotative speed of the shafts begins to increase, the centrifugal force of rotation tends to move the weight portion 14a outwardly, rotating the same around the hinge 15 and also causing rotation of the links 17 around the hinge 18, in consequence whereof the line along which the hinges tend to be disposed becomes a broken one and the distance between the hinges 15 and 18 is decreased, which in turn decreases the angular displacement between the shafts. It will now be understood in view of the foregoing that the position of the linkage for any definite moment of operation depends upon the balance between the action of the driving force on said linkage tending to move it into the position shown in Fig. 3, and the centrifugal force tending to move the linkage outwardly into the position shown in Fig. 2. When this balance occurs the operation of the coupling becomes more or less uniform but any vibrations or pulsations which tend to occur are resisted by the inertia of the weight portion 14a and are largely absorbed in the process of changing the angular displacement between the driving and the driven shafts. By virtue of such a construction a resilient transmission of driving force is effected.

Means are provided to limit the outward movement of the linkage, said means being exemplified in the present embodiment of the invention by the bumpers 22 contacted by the weight portions 14a of each of the two linkages in their predetermined extreme positions.

The structure so far described although operative in its entirety has been found under some conditions to give undesirably large loose motion during starting and low speeds. Means are provided to eliminate or minimize the above disadvantages, and in the present embodiment of the invention said means are exemplified by a torsion spring 23 operatively mounted within the sleeve 10 and anchored therein with one of its ends while its other end is adapted to rotate a small sleeve 24 having a gear 25 formed thereon which gear meshes with a gear portion 14b formed on the end of the link 14 opposite to the weight end 14a, said gear portion being adapted to project into the sleeve 10 through a slot provided therein.

The force of the spring 23 is so selected that at the low speed of the engine it is sufficient to maintain the linkage in the position shown in Fig. 3, thereby aiding similar action of the driving force. When, however, the speed of the shafts and the centrifugal force increase, the spring is adapted to yield to the centrifugal force and to permit moving of the linkage into the position shown in Fig. 2. In the present embodiment of the invention the spring will keep the mechanism locked up to about 400 R. P. M., the invention not being limited, however, to the above figure, the same being given merely as an example. Above that speed, the centrifugal force overcomes the spring force and the coupling starts to act in its normal manner described above. At speeds above 1000 R. P. M., this figure again being given by way of example, the above effect of the spring is very small in relation to the centrifugal force and can be neglected.

The sleeve 10 is maintained in alignment with the reduction gear shaft 20 by means of a tail or pilot bearing 26 or in any other suitable manner. It is not deemed necessary to describe the connection of the propeller to the reduction gear shaft as well as some other details of conventional constructions herein employed in order not to obscure the above description of the present invention, and such a description has been dispensed with for the above reasons.

We claim:

1. A coupling adapted to be operatively interposed for transmission of mechanical energy between a driving shaft and a driven shaft, said shafts being coaxially arranged, said coupling comprising a sleeve arranged between said shafts and connected for positive rotative driving to said driving shaft, a link having one end hinged to said sleeve and another end hinged to a second link the opposite end whereof is hinged to said driven shaft, said hinge connections adapting the linkage so formed to operate in a plane perpendicular to the axis of rotation of said shafts, said linkage being further adapted to be aligned by the action of the driving force for positive transmission thereof when said shafts rotate below a predetermined speed, a weight portion formed on one of said links and adapted when the speed of the shafts increases above said predetermined speed to move said linkage in opposition to said action of the driving force into a position for resilient transmission of said force, a torsion spring arranged within said sleeve and connected thereto, and gear means operatively connecting said spring to said linkage to urge the same into the position for positive transmission of the driving force.

2. A coupling adapted to be operatively interposed between a driving shaft and a driven shaft for transmission of mechanical energy, said coupling including a pair of linkages, each linkage bodily revolving with said shafts and operable in the plane of its rotation to vary the angular displacement between said shafts, each linkage being adapted to be aligned by the action of the driving force to effect maximum angular displacement between said shafts when the same operate below a predetermined rotative speed, a weight provided on each linkage and adapted when the rotative speed of said shafts increases above said predetermined point to move said linkage in opposition to the action of said driving force toward the position effecting minimum angular displacement of said shafts, spring means, and means carried by each linkage and having a common operative connection with said spring means for transmitting to said linkages effort exerted by the spring means in opposition to said centrifugal force.

3. A coupling adapted to be operatively interposed for transmission of mechanical energy between a driving shaft and a driven shaft, said shafts being coaxially arranged, said coupling comprising a sleeve arranged between said shafts and connected for positive rotative driving to said driving shaft, a pair of opposed links each having one end hingedly connected to said sleeve and another end hingedly connected to a second link the opposite end whereof is hingedly connected to said driven shaft, the hinge connections of said links adapting the linkages so formed to operate at opposite sides of the shaft in planes perpendicular to the axis of rotation of said shafts, centrifugal means adapted to act on each of said linkages and to move the same into positions for resilient transmission of the driving force, spring means arranged within said sleeve and connected thereto, and gear means operatively connecting said spring means to said linkages to urge the same into the positions for positive transmission of the driving force.

4. A coupling adapted to be operatively interposed between a driven shaft and a driving shaft arranged substantially along a common axis for transmission of mechanical energy, said coupling comprising a linkage movable transversely of said shafts and positively connecting said shafts for driving when the low driving effort is transmitted by said coupling, a weight carried by said linkage and adapted when affected by the centrifugal force of rotation to change the distance between the connected portions of said shafts in opposition to the driving force tending to move said linkage into the original position, a torsion spring mounted between said shafts and having one part thereof operatively connected to one of the shafts, and gear means operatively connecting another part of said spring to said linkage, said spring adapted to exert an effort tending to move said linkage in opposition to the centrifugal force.

5. A coupling adapted to be operatively interposed for transmission of mechanical energy between a driving shaft and a driven shaft, said shafts being coaxially arranged, said coupling including a linkage comprising two links, one of said links having one end hinged to said driving shaft and the other link having one end hinged to said driven shaft, the free ends of said links being hingedly connected together, said linkage being adapted to be moved in a plane substantially perpendicular to the axis of said shafts and to be moved by the rotative force transmitted by said coupling into a position for locking said shafts together positively, said linkage adapted to be moved by centrifugal force into a position for resilient transmission of the rotative force, said resiliency being effected by a position of the movable linkage determined by the balance of the rotative force and the centrifugal force acting on said linkage, a torsion spring arranged coaxially with said shafts and having one part thereof operatively connected to one of the shafts, and gear means drivingly connecting another part of said spring to said linkage, said spring acting on said linkage in opposition to the centrifugal force to maintain said linkage in its locked position below a predetermined rotative speed of said shafts.

6. A coupling adapted to be operatively interposed for transmission of mechanical energy between a driving shaft and a driven shaft, said shafts being coaxially arranged, said coupling including a linkage comprising two links, one of said links having one end hinged to said driving shaft, and the other link having one end hinged to said driven shaft, the free ends of said links being hingedly connected together, said linkage being adapted to be moved in a plane substantially perpendicular to the axis of said shafts and to be moved by the rotative force transmitted by said coupling into a position for locking said shafts together positively, a weight portion provided on one of said links and adapted when the rotative speed of said shafts increases to move said linkage by the then developed centrifugal force into a position for resilient transmission of the rotative force, said resiliency being effected by a position of the movable linkage determined by the balance of the rotative force and the centrifugal force acting on said linkage, a torsion spring arranged coaxially with said shafts and having one part thereof operatively connected to one of the shafts, and gear means drivingly connecting another part of said spring to said linkage, said spring acting on said linkage in opposition to the centrifugal force to maintain said linkage in its locked position below a predetermined rotative speed of said shafts.

7. A coupling adapted to be operatively interposed between a driven shaft and a driving shaft arranged substantially along a common axis for transmission of mechanical energy, said coupling comprising a member pivoted at its inner end to one shaft at a fixed point and having a weight at its outer end, a link pivoted at one end to the other shaft at a fixed point and pivotally connected at its opposite end to said weight, said weight adapted when affected by the centrifugal force of rotation to change the distance between the connected portions of said shafts in opposition to the driving force tending to move said coupling into position to positively connect said shafts, and a spring arranged coaxially with said shafts and having one part thereof operatively connected to one of the shafts and another part thereof operatively connected to said member, said spring exerting a force tending to move said member in the direction opposite to that in which it is moved by said weight.

JOHN TJAARDA.
KLAAS KNIBBE.

CERTIFICATE OF CORRECTION.

Patent No. 2,387,195.   October 16, 1945.

JOHN TJAARDA, ET AL.

It is hereby certified that error appears in the printed specification of the above numbered patent requiring correction as follows: Page 3, first column, line 73, claim 2, strike out "pling including a pair of linkages, each linkage"; and that the said Letters Patent should be read with this correction therein that the same may conform to the record of the case in the Patent Office.

Signed and sealed this 29th day of January, A. D. 1946.

Leslie Frazer (Seal)   First Assistant Commissioner of Patents.

hingedly connected together, said linkage being adapted to be moved in a plane substantially perpendicular to the axis of said shafts and to be moved by the rotative force transmitted by said coupling into a position for locking said shafts together positively, a weight portion provided on one of said links and adapted when the rotative speed of said shafts increases to move said linkage by the then developed centrifugal force into a position for resilient transmission of the rotative force, said resiliency being effected by a position of the movable linkage determined by the balance of the rotative force and the centrifugal force acting on said linkage, a torsion spring arranged coaxially with said shafts and having one part thereof operatively connected to one of the shafts, and gear means drivingly connecting another part of said spring to said linkage, said spring acting on said linkage in opposition to the centrifugal force to maintain said linkage in its locked position below a predetermined rotative speed of said shafts.

7. A coupling adapted to be operatively interposed between a driven shaft and a driving shaft arranged substantially along a common axis for transmission of mechanical energy, said coupling comprising a member pivoted at its inner end to one shaft at a fixed point and having a weight at its outer end, a link pivoted at one end to the other shaft at a fixed point and pivotally connected at its opposite end to said weight, said weight adapted when affected by the centrifugal force of rotation to change the distance between the connected portions of said shafts in opposition to the driving force tending to move said coupling into position to positively connect said shafts, and a spring arranged coaxially with said shafts and having one part thereof operatively connected to one of the shafts and another part thereof operatively connected to said member, said spring exerting a force tending to move said member in the direction opposite to that in which it is moved by said weight.

JOHN TJAARDA.
KLAAS KNIBBE.

CERTIFICATE OF CORRECTION.

Patent No. 2,387,195. October 16, 1945.

JOHN TJAARDA, ET AL.

It is hereby certified that error appears in the printed specification of the above numbered patent requiring correction as follows: Page 3, first column, line 73, claim 2, strike out "pling including a pair of linkages, each linkage"; and that the said Letters Patent should be read with this correction therein that the same may conform to the record of the case in the Patent Office.

Signed and sealed this 29th day of January, A. D. 1946.

Leslie Frazer (Seal) First Assistant Commissioner of Patents.